US007271501B2

(12) United States Patent
Dukart et al.

(10) Patent No.: US 7,271,501 B2
(45) Date of Patent: *Sep. 18, 2007

(54) DATA TRANSMISSION BETWEEN A CHASSIS AND A SEAT MOVABLY ARRANGED ON THE CHASSIS

(75) Inventors: Anton Dukart, Gerlingen (DE); Harald Kazmierczak, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 718 days.

This patent is subject to a terminal disclaimer.

(21) Appl. No.: 10/729,211

(22) Filed: Dec. 5, 2003

(65) Prior Publication Data

US 2004/0113490 A1 Jun. 17, 2004

(30) Foreign Application Priority Data

Dec. 17, 2002 (DE) ................................ 102 58 847

(51) Int. Cl.

*B60L 1/00* (2006.01)
*B60L 3/00* (2006.01)
*H02G 3/00* (2006.01)

(52) U.S. Cl. ........................................................ 307/9.1

(58) Field of Classification Search ................. 307/9.1, 307/10.1, 147

See application file for complete search history.

(56) References Cited

U.S. PATENT DOCUMENTS 6,008,547 A * 12/1999 Dobler et al. .............. 307/10.1

* cited by examiner

*Primary Examiner*—Michael Sherry
*Assistant Examiner*—Carlos Amaya
(74) *Attorney, Agent, or Firm*—Kenyon & Kenyon LLP

(57) ABSTRACT

A system for transmitting data and/or energy between a chassis and a seat movably arranged on the chassis, the seat being able to glide in guide rails, attached to the chassis, with the aid of slides; one iron-core half of a transformer—the iron-core half bearing at least one primary winding—is disposed on the slide gliding in the guide rail, the primary winding being a cable lying in the guide rail; and the other iron-core half of the transformer having a secondary winding is arranged on the seat, the two iron-core halves of the transformer being positioned relative to each other for the data and/or energy transmission when the seat is mounted.

11 Claims, 4 Drawing Sheets

DATA TRANSMISSION BETWEEN A CHASSIS AND A SEAT MOVABLY ARRANGED ON THE CHASSIS

FIELD OF THE INVENTION

The present invention relates to a system for transmitting data and/or energy between a chassis and a seat arranged in a movable manner on the chassis, the seat being able to glide with the aid of slides in guide rails attached to the chassis.

BACKGROUND INFORMATION

To increase the safety of vehicle occupants, more and more functions are being integrated into the seats of vehicles, these functions being controlled and monitored electronically on the chassis side. Among these functions, in addition to the monitoring and triggering of airbags integrated in the seats, are also queries concerning seat occupancy and seat belt buckles, as well as child-seat detection for the optimal triggering of occupant restraint systems.

In general, data is transmitted in vehicles by bus systems via cable. This type of data transmission has proven itself. However, for vehicle seats, there is the problem that if the seats are mounted on rails allowing movement on the chassis of the vehicle, the cables must be tracked during a movement of the seat. In addition, the cables should be installed so that they cannot be damaged, and they present no danger of stumbling for the occupants of the vehicle. The disassembly of the seats presents another problem. For this, particularly for vehicle types such as vans or sports utility vehicles (SUV) whose passenger compartment should be easily variable, the cable connection must be releasable via an easily accessible plug connection, and the cables and plugs remaining on the chassis side must be stowed away in the vehicle floor.

SUMMARY OF THE INVENTION

An object of the present invention is to provide a system for transmitting data and/or energy between a chassis and a seat arranged in a movable manner on the chassis, which may be produced inexpensively, is easy to handle and presents no dangers for vehicle occupants.

According to the present invention, data and/or energy is transmitted between the chassis and the seat using a transformer whose one iron-core half is positioned on a slide gliding in a guide rail, and whose other iron-core half is positioned on the seat which glides via the slide in the guide rail attached to the chassis. After the seat has been mounted on the slide, the two iron-core halves of the transformer are positioned relative to each other for the inductive data transmission and/or energy transmission, the one half of the iron core being able to glide with the slide in the guide rail during a movement of the seat. To achieve a small overall depth of the guide rail, as well as easy and inexpensive assembly, at least one primary winding of the transformer is implemented as a cable lying in the guide rail. According to the present invention, the connection for the data and/or energy transmission between the chassis and the seat results automatically when placing the seat on the slide, since in so doing, the two iron-core halves are joined. Therefore, no additional manipulation for producing the connection and no cable and plug connections are necessary.

If the cable lying in the guide rail is guided through the iron-core half arranged on the slide, this iron-core half may be closed on the side facing the guide rail, which, with the other iron-core half mounted, yields a closed ferromagnetic circuit with a low resistance of the magnetic flux in the ferromagnetic circuit. The production of the slide and the guide rail, and the mounting of the slide in the guide rail are facilitated.

To prevent the cable from bringing foreign bodies, particularly iron-containing particles, into the transformer when the seat moves, the cable is tensioned in the guide rail by a clamping device to prevent contamination of the cable with foreign bodies from the bottom of the rail and/or foreign bodies adhering to the cable are removed by a cleaning device mounted on the slide.

Production and assembly of the system may be further simplified by joining one cable end to the electroconductive guide rail and using the guide rail as a return conductor. Thus, no additional cable for the return line is necessary outside of or within the guide rail. In conjunction with the vehicle mass, the transmission system is additionally shielded from interferences.

If, to improve the reliability of the transmission system, separate primary windings are used for the data transmission and the energy transmission, the windings are advantageously combined in one cable. For shielding against electrical fields, the cable may have a coaxial construction including an inner conductor and a shield, the inner conductor being used for energy transmission and the shield being used for data transmission or vice versa. The feedback of both windings may be effected jointly via the electroconductive guide rail. With secondary windings for data transmission and energy transmission likewise separate on the seat side, it is possible to transmit data and power separately from each other.

DETAILED DESCRIPTION

According to the present invention, the data is transmitted in a cable-less manner at the interface between the seat and the chassis using an inductive connection. Existing cable connections may easily be replaced by the system of the present invention without having to change the existing data-transmission system of the vehicle. It may only be necessary to provide amplifiers on the seat side and/or the chassis side which condition, amplify and feed the signals to be transmitted or received into the bus system on the chassis side.

If no energy source is provided on the seat side for powering sensors or an amplifier, the needed energy (e.g. 5 watts) may likewise be transmitted from the chassis via the inductive connection to the seat; the data signal to be transmitted may be modulated upon the energy-carrier wave. For a reciprocal data transmission between the seat and the chassis, it may be advantageous to provide separate primary and/or secondary windings on the transformer for the data and energy transmission.

Figure 1:
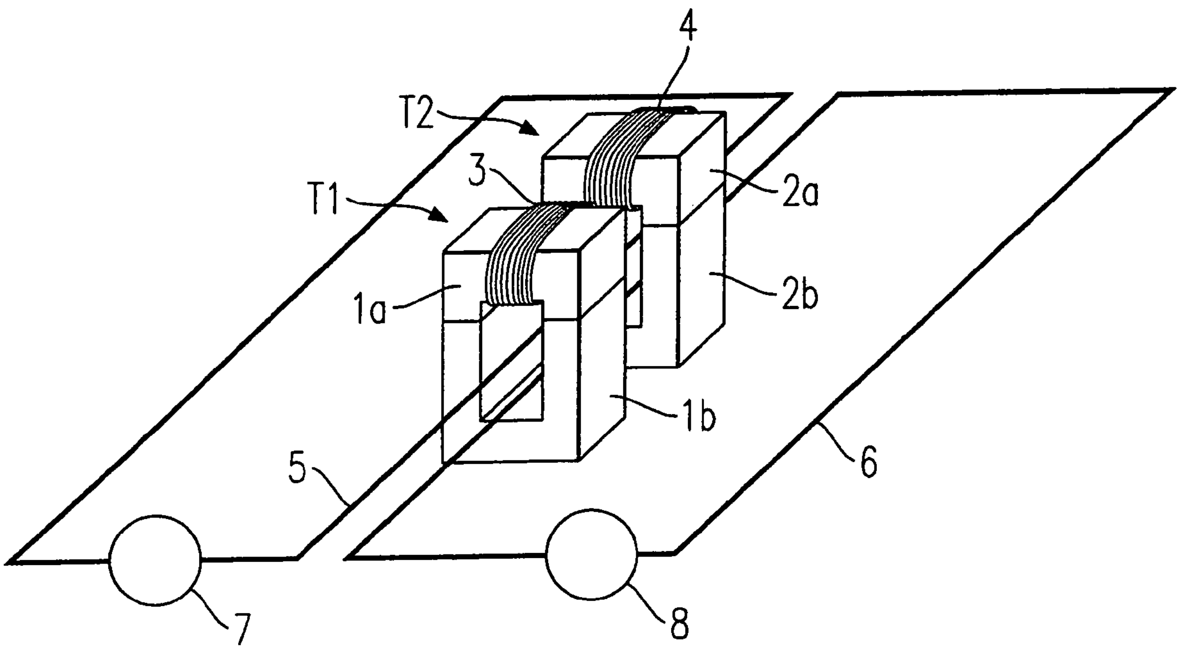
FIG. 1 shows a basic representation of the data and energy transmission according to one embodiment of the present invention, having one transformer for the data transmission and one transformer for the energy transmission.

FIG. 1 shows a basic representation of the data and energy transmission according to one embodiment of the present invention, having one transformer T1 for the data transmission and one transformer T2 for the energy transmission between the chassis and the seat. The iron cores of transformers T1 and T2 are made of two halves 1*a*, 1*b* and 2*a*, 2*b*, respectively, iron-core halves 1*b* and 2*b* being arranged on the slide, and iron-core halves 1*a* and 2*a* bearing secondary windings 3, 4 being arranged on the seat (not shown). Wires 5 and 6 pass through downwardly closed iron-core halves 1*b* and 2*b* as primary windings. They are fed by sources 7 and 8. Sources 7, 8 and transformers T1, T2 with their secondary windings 3, 4 are suitably adapted according to the data transmission or energy transmission, the data transmission taking place in both directions between the chassis and the seat.

Although in the example shown in FIG. 1, the primary windings are made of only one turn, wire 5 or 6, it is also possible to use a plurality of turns. They could advantageously be accommodated in one cable.

Figure 2A:
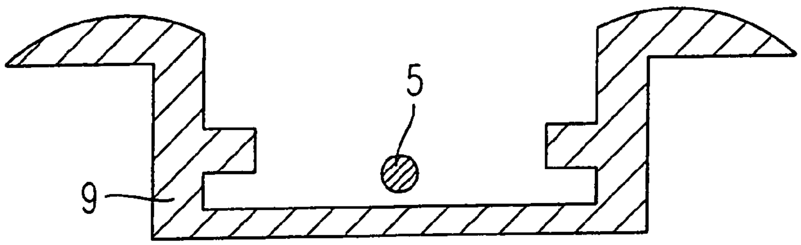
FIGS. 2*a*, 2*b* and 2*c* show an example for the design of the system according to the present invention.
Figure 2B:
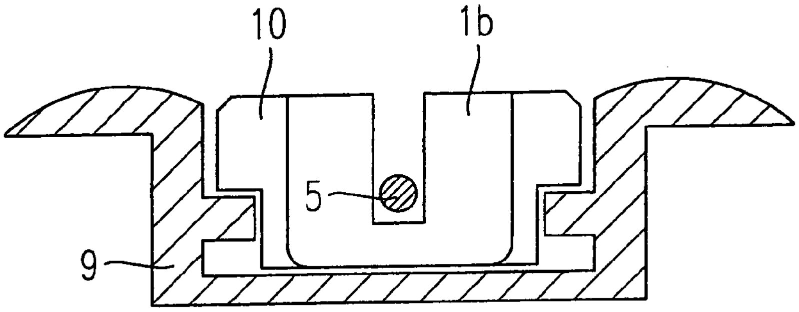

According to the exemplary embodiment shown in FIG. 2*a*, the primary winding, cable 5, lies in guide rail 9 which is secured to a chassis, i.e. to the floor of the passenger compartment of a vehicle (not shown). FIG. 2*b* shows slide 10, gliding in guide rail 9, which is used for accommodating a seat. Cable 5 is secured at both ends of guide rail 9 (not shown) and is guided through iron-core half 1*b* attached to slide 10.

Figure 2C:
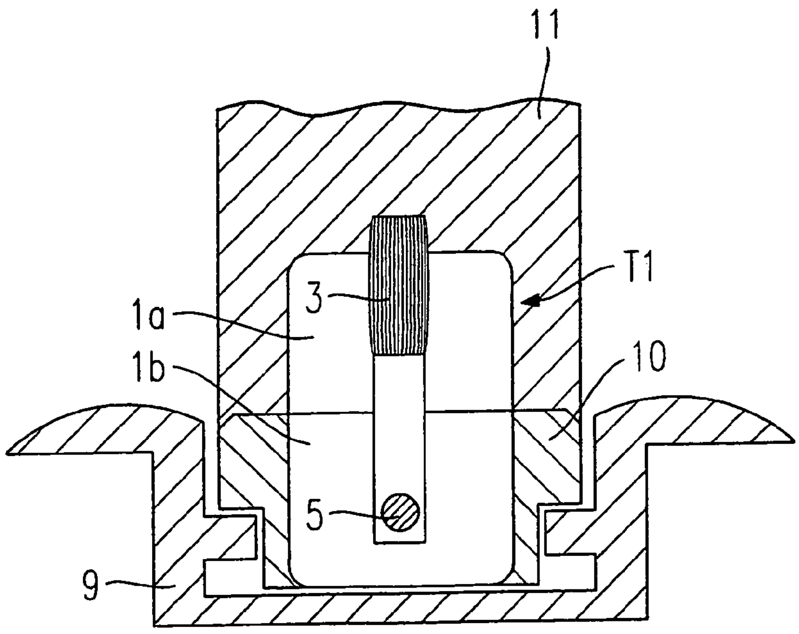

As shown in FIG. 2*c*, upon fastening seat 11 on slide 10, the ferromagnetic circuit of transformer T1 is closed by joining iron-core halves 1*a* and 1*b*, whereupon the system for data and/or energy transmission is operational.

When seat 11 is moved, slide 10 glides in guide rail 9, and cable 5 glides through closed iron core 1*a*, 1*b* of transformer T1. In so doing, iron-containing foreign bodies, in particular, should be prevented from getting into the interior of transformer T1 and thus reducing its efficiency.

Figure 3:
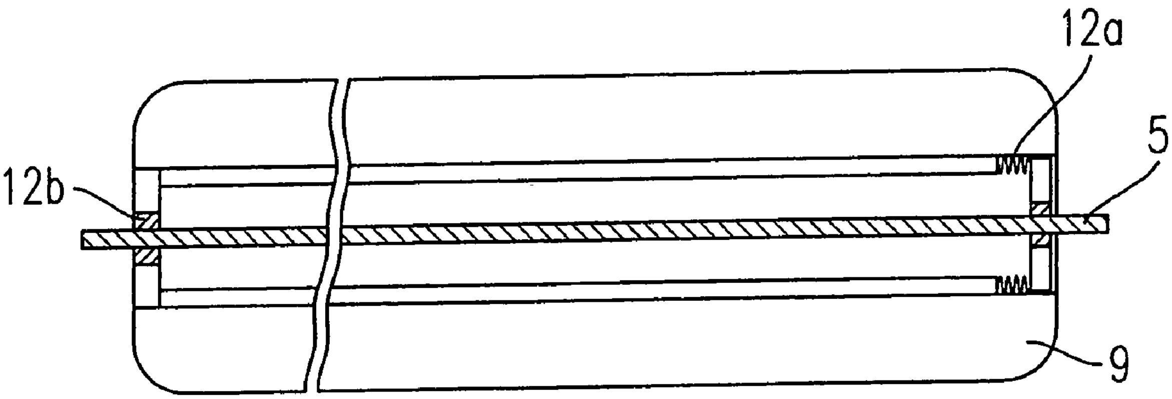
FIG. 3 shows an example for a cable-clamping device according to the present invention.

Since guide rail 9 is generally located below seat 11, foreign bodies may easily penetrate through its upwardly directed opening. For this, according to the present invention, as shown in FIG. 3 by way of example, a clamping device 12*a*, 12*b* is disposed on guide rail 9 which lifts cable 5 off of the bottom of guide rail 9, and thus prevents cable 5 from coming into contact with foreign bodies on the bottom of guide rail 9. In the example shown in FIG. 3, clamping device 12*a*, 12*b* is made of two clamps 12*a* and 12*b* which are fastened to guide rail 9 and fix cable 5 in position, clamp 12*b* being flexibly attached to guide rail 9 and tensioning cable 5.

Figure 4:
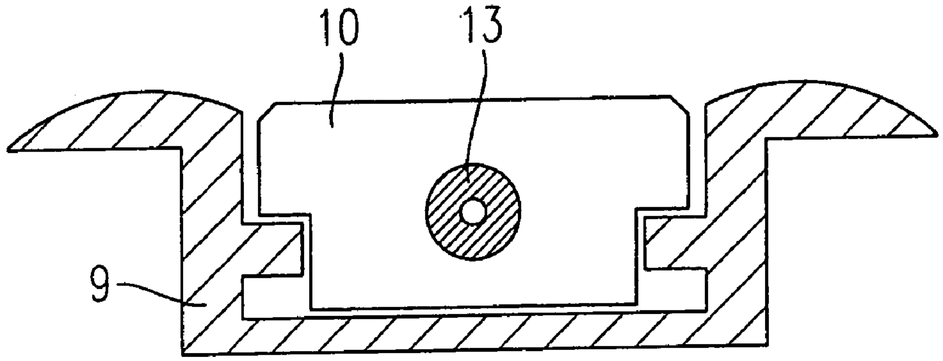
FIG. 4 shows an example for a cable-cleaning device according to the present invention.

In the example shown in FIG. 4, at the opening at which cable 5 enters into slide 10, a cleaning lip 13 is mounted which wipes off foreign bodies adhering to cable 5, and thus prevents these foreign bodies from penetrating into iron core 1*a*, 1*b* of transformer T1. However, it is also possible to provide the exposed cable sections in front of and behind slide 10 with a protective sheath which is stretched or compressed during the movement of slide 10 in guide rail 9 (not shown).

Figure 5A:
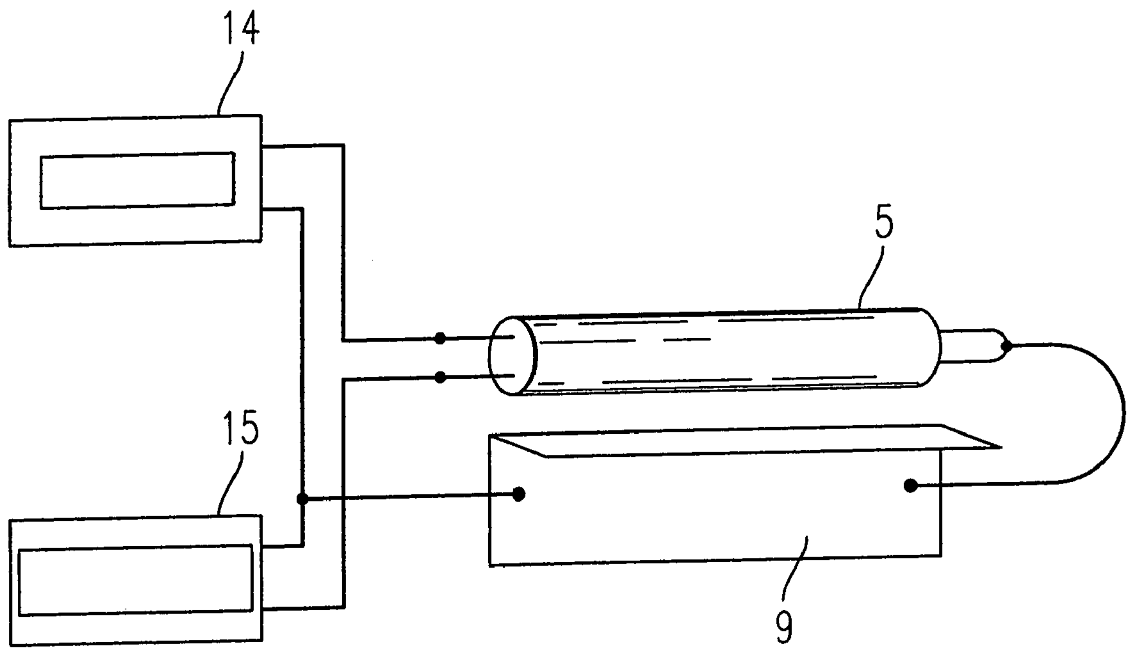
FIGS. 5*a* and 5*b* show a basic representation of the primary winding according to one embodiment of the present invention, having one turn each for the data transmission and energy transmission.
Figure 5B:
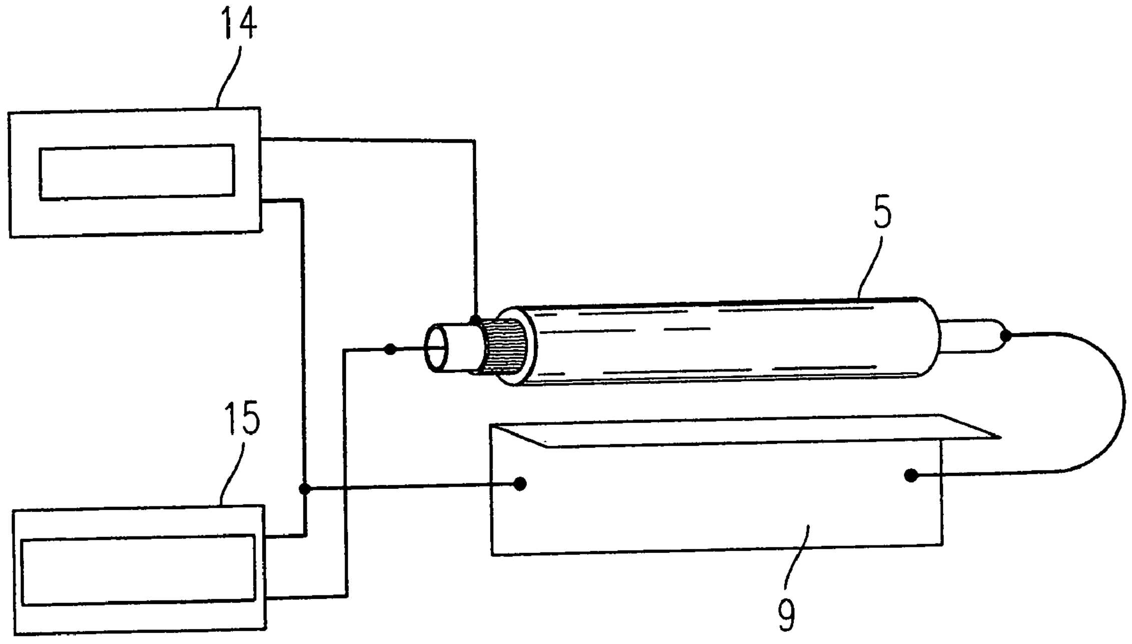

If only low powers are transmitted between the chassis and seat 11, the primary winding for data and/or energy transmission may be designed with only one turn. FIGS. 5*a* and 5*b* show such a design of the primary winding in a basic representation. Cable 5 shown in FIG. 5*a* has two conductors, which in each case represent a primary winding. One conductor of cable 5 is used for data transmission and is supplied by data generator 14, while the other conductor is used for energy transmission and is supplied by energy generator 15. At the end of cable 5, both conductor ends are brought together and electrically connected to guide rail 9. The joint feedback of the data line and energy line to data generator 14 and energy generator 15 is effected via electroconductive guide rail 9. Thus, no additional cable is necessary outside of or within the guide rail for the return lines. Assembly of the transmission system is simplified. In conjunction with the vehicle mass, the transmission system is additionally well shielded by guide rail 9 from interferences.

In the example shown in FIG. 5*b*, a shielded cable 5 is used to further increase the interference immunity. The inner conductor of cable 5 is supplied by energy generator 15, the shield of cable 5 is supplied by data generator 14. The feedback of the two primary windings may be effected via guide rail 9, like the example shown in FIG. 5*a*.

Cable 5, supplied by generators 14, 15, generates two different fields with the shield and the inner conductor. When working with such a shielded cable, only the electrical portion has an effect with respect to electromagnetic waves. Magnetic fields generated by the current of the inner conductor are not influenced by the shield of cable 5.

The present invention is not limited to the examples described. Thus, it is also possible to provide a plurality of slides with transformers on one guide rail and/or, if the seat is secured by a plurality of guide rails, to likewise provide transformers at them, in order to create transmission paths separate from each other which may be necessary for safety reasons for activating and monitoring restraint systems integrated in the seats.

REFERENCE NUMERAL LIST

1*a*, 2*a* iron-core half of a transformer mounted on the seat side
1*b*, 2*b* iron-core half of a transformer attached to a slide gliding in a guide rail
3, 4 secondary winding
5, 6 primary winding
7, 8 source
9 guide rail
10 slide
11 seat
12*a*, 12*b* clamping device
13 cleaning lip
14 data generator
15 energy generator

What is claimed is:

1. A system for transmitting at least one of data and energy between a chassis and a seat, the seat being situated in a movable manner on the chassis with the aid of at least one slide which glides in a guide rail attached to the chassis, the system comprising:

a transformer including a first iron-core half and a second iron-core half, the first iron-core half including at least one primary winding, the first iron-core half being situated on the slide, the primary winding including a cable lying in the guide rail, the second iron-core half including at least one secondary winding, the second iron-core half being situated on the seat, the first and second iron-core halves being situated relative to each other for the at least one of the data and energy transmission.

2. The system according to claim 1, wherein the cable is guide through the first iron-core half.

3. The system according to claim 1, wherein the cable is tensioned in the guide rail by a clamping device.

4. The system according to claim 1, wherein a cleaning device which removes foreign bodies adhering to the cable during a movement of the slide in the guide rail is situated on the slide.

5. The system according to claim 1, wherein the cable has at least two conductors, a first of the conductors being provided for the energy transmission, a second of the conductors being provided for the data transmission.

6. The system according to claim 5, wherein the guide rail is composed of an electrically conductive material, and at least one of the conductors is electroconductively connected at one end of the cable to the guide rail.

7. The system according to claim 1, wherein the cable had a coaxial construction including an inner conductor and a shield, the inner conductor being for the energy transmission and the shield being for the data transmission.

8. The system according to claim 1, wherein the cable has a coaxial construction including an inner conductor and a shield, the inner conductor being for the data transmission and the shield being for the energy transmission.

9. The system according to claim 1, wherein the guide rail is composed of an electrically conductive material, the cable has a coaxial construction including an inner conductor and a shield, and at least one of the inner conductor and the shield is electroconductively connected at one end of the cable to the guide rail.

10. The system according to claim 1, wherein, on a seat side, the transformer includes one secondary winding for the data transmission and a further secondary winding for the energy transmission.

11. The system according to claim 1, further comprising a further transformer situated between the slide and the seat, one of the transformers being adapted for data transmission and the other of the transformers being adapted for energy transmission.

* * * * *